(12) United States Patent
Siebert

(10) Patent No.: US 12,236,299 B2
(45) Date of Patent: Feb. 25, 2025

(54) DEVICE FOR PRESENTING A CODE

(71) Applicant: PEPPERL+FUCHS SE, Mannheim (DE)

(72) Inventor: Gerhard Siebert, Frankenthal (DE)

(73) Assignee: PEPPERL+FUCHS SE, Mannheim (DE)

( * ) Notice: Subject to any disclaimer, the term of this patent is extended or adjusted under 35 U.S.C. 154(b) by 0 days.

(21) Appl. No.: 18/245,502

(22) PCT Filed: Jun. 9, 2022

(86) PCT No.: PCT/DE2022/200117
§ 371 (c)(1),
(2) Date: Mar. 15, 2023

(87) PCT Pub. No.: WO2023/274463
PCT Pub. Date: Jan. 5, 2023

(65) Prior Publication Data
US 2023/0409858 A1    Dec. 21, 2023

(30) Foreign Application Priority Data

Jun. 30, 2021  (DE) ............... 10 2021 206 872.3

(51) Int. Cl.
*G06K 19/06*      (2006.01)
(52) U.S. Cl.
CPC .............. *G06K 19/06037* (2013.01)
(58) Field of Classification Search
CPC ............................... G06K 19/06037
USPC .............................. 235/487, 494
See application file for complete search history.

(56) References Cited

U.S. PATENT DOCUMENTS

| 4,649,658 | A | * | 3/1987 | Sarton | H01B 7/368 |
| | | | | | 40/317 |
| 4,976,179 | A | | 12/1990 | Lacrouts-Cazenave | |
| 5,397,542 | A | * | 3/1995 | Nelms | B01L 9/06 |
| | | | | | 422/562 |
| 7,963,056 | B1 | * | 6/2011 | Mangone, Jr. | G09F 3/205 |
| | | | | | 24/459 |
| 2007/0205901 | A1 | * | 9/2007 | Kokuryo | G06K 19/041 |
| | | | | | 340/572.8 |
| 2020/0104664 | A1 | * | 4/2020 | Feiten | G06K 7/10 |

FOREIGN PATENT DOCUMENTS

| DE | 3300908 A1 | 7/1983 |
| DE | 3875283 T2 | 3/1993 |
| EP | 0374294 A1 | 6/1990 |
| EP | 0579486 A2 | 1/1994 |
| EP | 1830311 A2 | 9/2007 |

OTHER PUBLICATIONS

International Search Report and Written Opinion for PCT/DE2022/200118 (ISA/EP) mailed Sep. 27, 2022 w/English translation.

* cited by examiner

*Primary Examiner* — Paultep Savusdiphol
(74) *Attorney, Agent, or Firm* — Alston & Bird LLP

(57) ABSTRACT

An apparatus for the presentation of a code (1), in particular code tape or code strip, with a carrier (2) and at least one code (1) assigned to the carrier (2), is, with regard to a safe installation of several carriers (2) relative to one another, designed and further developed with structurally simple means in such a way that the carrier (2) has a coupling device (3) for coupling the carrier (2) to a further carrier (2).

16 Claims, 3 Drawing Sheets

DEVICE FOR PRESENTING A CODE

CROSS REFERENCE TO RELATED APPLICATIONS

This application is a National Stage Application, filed under 35 U.S.C. § 371, of International Application No. PCT/DE2022/200117, filed Jun. 9, 2022, which international application claims priority to and the benefit of German Application No. 10 2021 206 872.3, filed Jun. 30, 2021; the contents of both of which as are hereby incorporated by reference in their entireties.

BACKGROUND

Technical Field

The invention relates to an apparatus for presenting a code, in particular code tape or code strip, having a carrier and at least one code associated with the carrier.

Description of Related Art

Apparatuses of the type mentioned above are known from practice and exist, for example, in the form of code tapes or code strips, wherein codes printed on a metallic carrier or otherwise assigned to the carrier are read and detected by suitable reading devices or detectors.

Furthermore, systems consisting of a code tape and a read head are known from the state of the art, which originally come from rail-guided applications, in which, for example, vehicles are guided on rails and a position determination of the vehicles relative to the rails or an environment takes place. More recently, the systems have been adapted to a sub-surface or ground, for example for the guidance of driverless transport systems. Due to the driverless transport system itself, but also due to forklift traffic, for example, a code tape arranged on the ground or floor is exposed to strong mechanical loads, which can easily lead to damage and/or displacement of carriers or code tapes positioned relative to each other, for example if several carriers arranged one behind the other form a longer code section. As a result, the function of such a code band or code section formed from several carriers is no longer guaranteed.

Furthermore, laying several carriers one behind the other is also not easy with the known apparatus due to the precise positioning of the carriers relative to each other required for reliable functioning of a code line. This applies not only to the initial laying of a code route and the laying of a code route around curves, but also to the replacement of individual or several carriers due to wear. A robust and modular solution that allows easy replacement of individual carriers is desirable in practice to ensure reliable functioning in the long term, especially of a code line formed from several carriers.

BRIEF SUMMARY

The present invention is therefore based on the task of designing and further developing an apparatus for the presentation of a code of the type mentioned at the beginning in such a way that a safe installation of several carriers relative to one another is made possible by structurally simple means.

According to the invention, the foregoing task is solved by an apparatus for presenting a code having the features of the pending claims. Thereafter, the apparatus is configured and further formed such that the carrier has a coupling device for coupling the carrier to another carrier.

In accordance with the invention, it has first been recognized that the preceding task is solved in a surprisingly simple manner by clever design of the carrier. In a further manner according to the invention, the carrier has for this purpose a coupling device for coupling the carrier to a further carrier. Such a coupling device allows a predefined relative positioning of two or more carriers one behind the other. In a desired row, one carrier can be coupled to another, etc., so that a code path of virtually any length can be realized. In this case, two carriers are always securely joined together, so that the effects of mechanical stress caused by transport systems or forklift traffic, such as unintentional displacement of the carriers relative to each other, can also be greatly reduced. By means of such a coupling device, not only is an initial laying of several carriers to form a code line greatly simplified, but also a replacement of worn carriers is made easy. In this case, an undamaged carrier can be safely inserted into an existing code section by means of the coupling device in exchange for a worn carrier. The required precise alignment of the codes to each other is made possible simply and reliably by coupling the carriers and aligning them to each other by means of the coupling device.

Consequently, the apparatus according to the invention for the presentation of a code provides an apparatus according to which a safe installation of several carriers relative to each other is made possible by structurally simple means.

With regard to a particularly secure installation of multiple carriers relative to each other, the coupling device may comprise a preferably male engaging element and a preferably female receiving element for the engaging element, wherein an engaging element of one carrier may engage with a receiving element of another carrier for coupling the two carriers to each other. By means of an engagement realized by means of the engaging element and the receiving element, a secure coupling of two carriers is ensured, wherein an undesired displacement of the carriers relative to each other in the installed state caused by external forces can be prevented to the greatest possible extent. With a suitable design of the engaging element and the receiving element, a required relative positioning or alignment of two carriers to each other can be specified reliably and permanently.

Furthermore, with regard to a particularly safe installation of several carriers relative to each other, the engaging element and the receiving element can be designed to be complementary to each other. This ensures a particularly secure coupling and engagement of an engaging element with a receiving element, in particular to ensure the required permanent relative positioning of two carriers with respect to each other.

In a particularly advantageous manner, the carrier can have both an engaging element and a receiving element. This enables safe and flexible coupling of the carrier with virtually any other carriers. Depending on requirements, the carrier can also have only one engaging element or only one receiving element, for example at the beginning and/or end of a code route to be implemented.

In a further advantageous embodiment, the coupling device can be designed in such a way that gapless and/or form-fitting coupling of carriers to one another is possible, wherein preferably with an engaging element being able to be joined to a receiving element in a puzzle-like manner. This enables particularly simple installation with a predefined alignment of the carriers and thus also of the codes to each other.

With regard to a particularly simple and safe installation of a plurality of carriers relative to one another, in particular at a predetermined angle relative to one another, the engaging element and the receiving element can be pivoted relative to one another in the assembled state, wherein preferably the engaging element and the receiving element can be designed in such a way that, in the assembled state of the engaging element and the receiving element, at least one recess is formed between the engaging element and the receiving element to enable such pivoting. This allows a predefined angular positioning of the carriers relative to each other—in the assembled state of the engaging element and the receiving element. During the angular positioning process, the carriers to be coupled are thus already joined together, so that unwanted decoupling of carriers that have already been coupled can be avoided during angular positioning. The pivoting can be done in the circumference of the realized slot, wherein the respective ends of a slot can form a mechanical stop for the pivoting movement of the carriers relative to each other. The size of the slot can determine the angular range of the swivel movement.

In a structurally particularly simple manner, the engaging element may have a circular disc-shaped portion, and wherein preferably the receiving element may have a recess substantially complementary to the circular disc-shaped portion of the engaging element. Such a circular disk-shaped section, in particular in conjunction with a corresponding complementary recess of a receiving element, can enable the above-described pivoting movement of the carriers relative to one another in a particularly simple manner. The circular disk-shaped section can slide its outer edge along an inner edge of the complementarily formed recess during the pivoting movement. In two-dimensional form, the underlying principle is roughly similar to that of a ball joint with a movable ball arranged in a socket, wherein the engaging element corresponds to the ball and the receiving element to the socket.

In an advantageous embodiment, at least one code may be associated with the engaging element or the circular disk-shaped section or may be arranged on the engaging element or the circular disk-shaped section. This allows a continuous sequence of codes arranged next to each other and thus also a safe installation of several carriers relative to each other for the function of a code line formed by several carriers with structurally simple means.

Furthermore, with regard to a safe installation of several carriers relative to each other, the coupling device may comprise at least one—preferably removable—blocking element assignable to the receiving element or the engaging element for preventing the engaging element and the receiving element—in the assembled state of the engaging element and the receiving element—from pivoting relative to each other. This enables a straight-line arrangement of several carriers one behind the other by structurally simple means, wherein blocking element can be arranged, for example, in a slot formed between the engaging element and the receiving element in order to prevent two carriers from pivoting relative to one another. Such blocking elements can in principle be arranged or provided in the slots to allow straight and aligned arrangement of carriers relative to each other. If a curve then has to be laid, the blocking elements can be removed from a slot and a corresponding angular position between two carriers can be formed by pivoting the two carriers relative to each other.

In a structurally particularly simple manner, the carrier can be made of metal, for example aluminum, or have metallic components, for example aluminum. In particular, the use of aluminum enables a robust and, in terms of weight, lightweight and thus safe and easy-to-handle design of a carrier. Furthermore, with a view to safe installation, for example laying of carriers on a flat substrate, the carrier can be of flat design. This allows full-surface and thus secure and stable support of carriers on a flat substrate.

With the apparatus for presenting a code according to the invention, an exact alignment of codes to each other during laying is possible, wherein both straight code sections and—with a suitable design of the coupling device—also curves of codes can be reliably laid by means of the carriers. In this case, no code becomes unreadable at joints between carriers and the spacing of codes does not increase when curves are laid, as can occur with conventional rectangular carriers or code strips without a suitable coupling device.

With the apparatus according to the invention, simple and safe laying is possible both straight ahead and in freely selectable bending radii. In addition, easy interchangeability and a professional appearance are realized.

In the context of the present invention, the term "code" is to be understood in the broadest sense, so that the most diverse embodiments of codes are encompassed by this term "code". These can be, for example, 2D codes, matrix codes, data matrix codes, QR codes, bar codes or other codes without restriction.

BRIEF DESCRIPTION OF THE FIGURES

There are various ways to advantageously configure and further develop the teaching of the present invention. For this purpose, reference is made on the one hand to the subordinate claims and on the other hand to the following explanation of preferred embodiments of the process according to the invention as well as of the apparatus according to the invention on the basis of the drawing. In connection with the explanation of the preferred embodiments with reference to the drawing, generally preferred embodiments and further embodiments of the teaching are also explained. In the drawing, the figures show FIG. 1 in a plan view, schematic, an embodiment of the apparatus according to the invention for presenting a code with three carriers, FIG. 2 in a plan view, schematic and enlarged, two carriers of the embodiment in a coupled and rectilinear arrangement, and FIG. 3 in a plan view, schematic and enlarged, two carriers of the embodiment in a coupled and relative to each other pivoted arrangement.

DETAILED DESCRIPTION OF VARIOUS EMBODIMENTS

Figure 1:
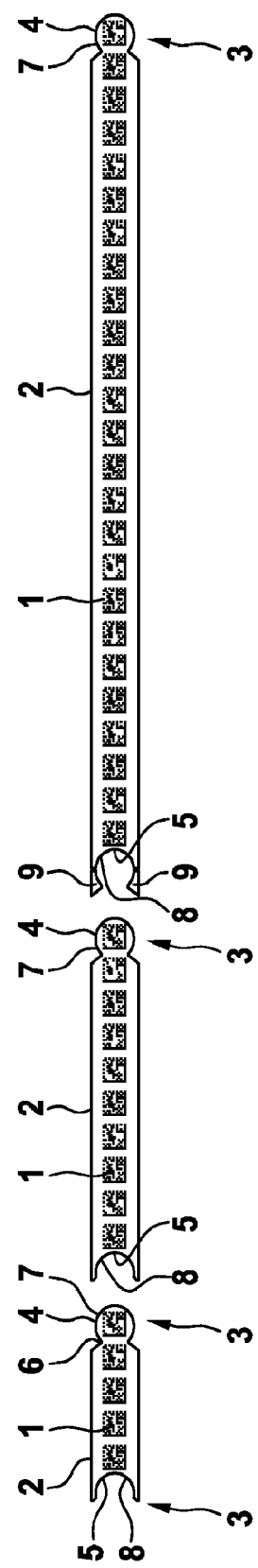

FIG. 1 shows a schematic plan view of an embodiment of the apparatus according to the invention for presenting a code, wherein a plurality of codes 1 are assigned to a total of three metallic carriers 2 in succession in the longitudinal direction. Each carrier 2 thus forms a code strip, wherein the three code strips shown in FIG. 1 have different lengths in order to be able to meet different installation requirements. Each of the three carriers 2 or code strips can be coupled with one of the other carriers 2 or code strips. The carrier 2 shown on the left in FIG. 1 has a total of four codes 1.

In this embodiment, the codes 1 are in the form of data matrix codes. Several such carriers 2 or code strips can be arranged in series to form a continuous code arrangement or code bar.

The carriers 2 are shown in FIG. 1 in the uncoupled state. By means of a coupling device 3, the carriers 2 can each be coupled to one another. The coupling device 3 has a male engaging element 4 and a female receiving element 5 for the engaging element 4. Each carrier 2 has both an engaging element 4 and a receiving element 5, wherein the engaging element 4 and the receiving element 5 are formed substantially complementary to each other.

The connection of the code strips formed by the carriers 2 is similar to the puzzle principle. Carriers 2 can be used to generate both straight-line code sections or code lines and code sections or code lines that go around curves or form curves.

Figure 2:
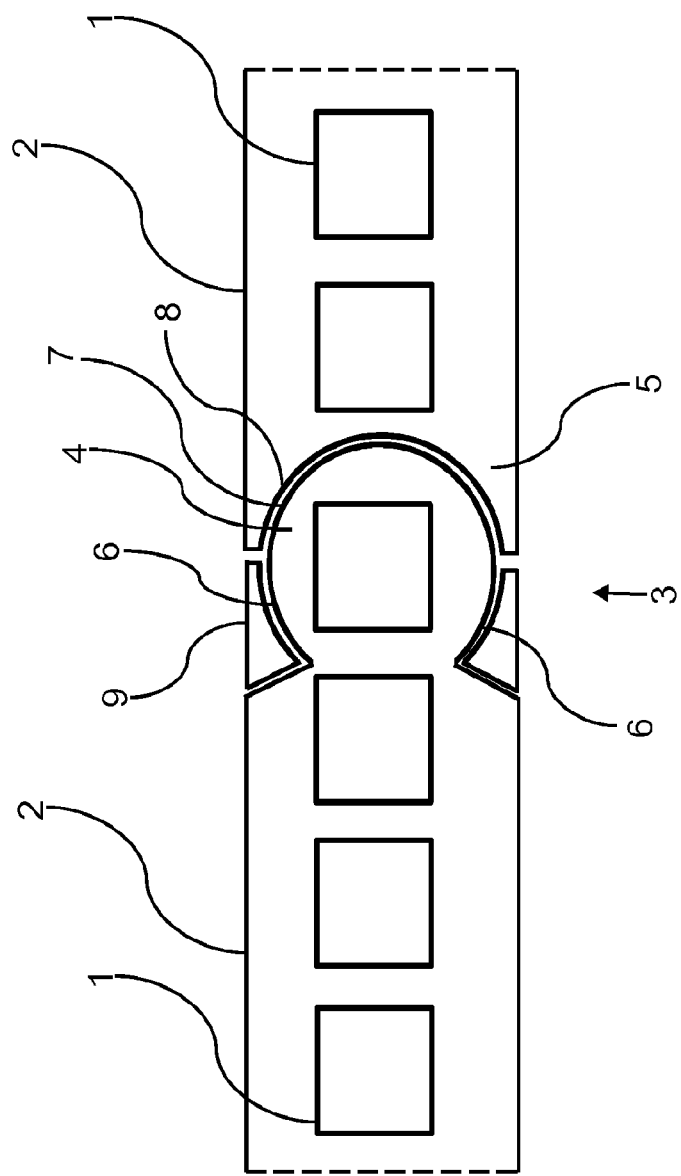

For this purpose, FIG. 2 shows a schematic and enlarged plan view as well as, in part, a coupling area of a rectilinear code path. In this case, the engaging element 4 and the receiving element 5 of the coupling device 3 are in the coupled state.

Figure 3:
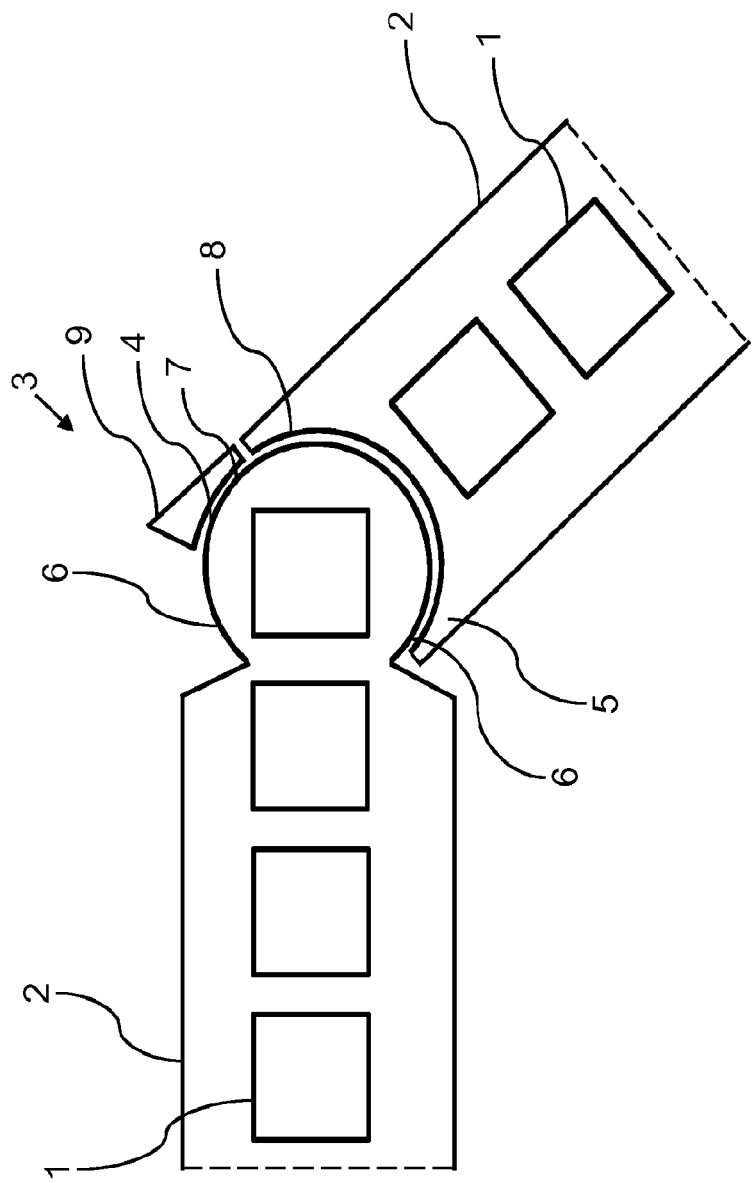

Furthermore, FIG. 3 shows a schematic and enlarged plan view as well as a partial coupling area of a curved code path. In this case, the engaging element 4 and the receiving element 5 of the coupling device 3 are in the coupled state, and wherein the respective carriers 2 pivoting relative to one another about a pivot axis. The swivel axis is located approximately in the center of the circular disk-shaped engaging element 4. To enable this pivoting, two slots 6 are formed essentially between the engaging element 4 and the receiving element 5. Specifically, the engaging element 4 has a circular disc-shaped portion 7, the receiving element 5 having a recess 8 substantially complementary to the circular disc-shaped portion 7 of the engaging element 4. As the two carriers 2 pivot relative to each other, the outer edge of the circular disk-shaped section 7 slides against an inner edge of the complementary recess 8. This technique enables two carriers 2 to be securely coupled on the one hand and a code route to be flexibly laid on the other, thanks to the possibility of swiveling the carriers 2 relative to each other.

In the rectilinear arrangement of the carriers 2 in FIG. 2, there are also two slots 6, wherein these slots 2 being filled by blocking elements 9 to prevent unintentional, inadvertent pivoting of the carriers 2 relative to one another and to reliably ensure rectilinear alignment of the carriers 2. The blocking elements 9 can be inserted into the slots 6 or removed from these slots 6 as required and in a simple manner. As a result, flexible routing of a code route—even around curves—is possible with the present embodiment. With blocking elements 9 fixed to the engaging element 4 or the receiving element 5, a straight alignment of the carriers 2 can take place quasi-automatically or automatically during laying. In the event of a subsequent correction of the laying direction, one or more blocking elements 9 can be removed—as required—to allow the carriers 2 to be pivoted relative to each other in the required manner. The extent of pivoting or the desired angle between the carriers 2 can be adjusted in the coupled state of the engaging element 4 and the receiving element 5 by pivoting about the pivot axis.

In principle, the blocking element or elements 9 can be associated with the apparatus in any way. Thus, it is advantageously possible for the blocking elements 9 to be coupled to the receiving element 5 in an original state and to be broken away from the receiving element 5 as required—if necessary at a predetermined breaking point. In the embodiment shown in FIG. 3, one of the blocking elements 9 is still coupled to the receiving element 5, even though in the merely schematic representation of FIG. 3 there is a space between the blocking element 9 and the receiving element 5—for the sake of clarity. The advantage of this blocking element 9 remaining on the receiving element 5 is that there is still a frictional coupling of the carriers 2 between the engaging element 4 and the receiving element 5 or between the circular disc-shaped section 7 and the recess 8 even in this curved, curved arrangement of the carriers 2, since the recess 8 with the blocking element 9 still engages around the section 7 further than half the circumference of the section 7 in the coupled state. In another embodiment, the recess 8 may also be formed to engage around the section 7 in principle to such an extent that it engages further than halfway around the circumference of the section 7, even in the case of a curved arrangement of the carriers 2 and without a blocking element 9 still coupled to the receiving element 5, in order to prevent the carriers 2 from being accidentally pulled apart even without blocking elements 9. However, such a design reduces the possible extent—provided without blocking elements 9—of pivoting of the carriers 2 relative to one another, since the receiving element 5 then strikes the engaging element 4 on the inside earlier during pivoting. Thus, in this embodiment example, it is not possible to realize such tight curves with the carriers 2 as in the embodiment example shown in FIG. 3, in which the recess 8 would encompass the section 7 not further, but rather less than half of the circumference of the section 7, entirely without blocking elements 9. A non-positive coupling of the carriers 2 is only possible here with a blocking element 9 coupled to the receiving element 5.

The coupling of the carriers 2 are positive for both straight lines and curves. There may be the three or more or fewer module lengths of carriers 2 shown in FIG. 1 to accommodate different sections with different dynamics in a desired code route. It must be ensured that the codes 1 can also be easily recognized at the connection point at all times by means of a camera or detector.

With respect to further advantageous configurations of the device according to the invention, it has been recognized that the technical problem or task detailed previously herein can be solved in a surprisingly simple manner by clever design of the carrier. In a further manner according to the invention, the carrier has for this purpose a coupling device for coupling the carrier to a further carrier. Such a coupling device allows a predefined relative positioning of two or more carriers one behind the other. In a desired row, one carrier can be coupled to another, etc., so that a code path of virtually any length can be realized. In this case, two carriers are always securely joined together, so that the effects of mechanical stress caused by transport systems or forklift traffic, such as unintentional displacement of the carriers relative to each other, can also be greatly reduced. By means of such a coupling device, not only is an initial laying of several carriers to form a code line greatly simplified, but also a replacement of worn carriers is made easy. In this case, an undamaged carrier can be safely inserted into an existing code section by means of the coupling device in exchange for a worn carrier. The required precise alignment of the codes to each other is made possible simply and reliably by coupling the carriers and aligning them to each other by means of the coupling device. Consequently, the apparatus according to the invention for the presentation of a code provides an apparatus according to which a safe installation of several carriers relative to each other is made possible by structurally simple means.

With regard to a particularly secure installation of multiple carriers relative to each other, the coupling device may comprise a preferably male engaging element and a preferably female receiving element for the engaging element, wherein an engaging element of one carrier may engage with a receiving element of another carrier for coupling the two carriers to each other. By means of an engagement realized by means of the engaging element and the receiving element, a secure coupling of two carriers is ensured, wherein an undesired displacement of the carriers relative to each other in the installed state caused by external forces can be prevented to the greatest possible extent. With a suitable design of the engaging element and the receiving element, a required relative positioning or alignment of two carriers to each other can be specified reliably and permanently.

Furthermore, with regard to a particularly safe installation of several carriers relative to each other, the engaging element and the receiving element can be designed to be complementary to each other. This ensures a particularly secure coupling and engagement of an engaging element with a receiving element, in particular to ensure the required permanent relative positioning of two carriers with respect to each other.

In a particularly advantageous manner, the carrier can have both an engaging element and a receiving element. This enables safe and flexible coupling of the carrier with virtually any other carriers. Depending on requirements, the carrier can also have only one engaging element or only one receiving element, for example at the beginning and/or end of a code route to be implemented.

In a further advantageous embodiment, the coupling device can be designed in such a way that gapless and/or form-fitting coupling of carriers to one another is possible, wherein preferably with an engaging element being able to be joined to a receiving element in a puzzle-like manner. This enables particularly simple installation with a predefined alignment of the carriers and thus also of the codes to each other.

With regard to a particularly simple and safe installation of a plurality of carriers relative to one another, in particular at a predetermined angle relative to one another, the engaging element and the receiving element can be pivoted relative to one another in the assembled state, wherein preferably the engaging element and the receiving element can be designed in such a way that, in the assembled state of the engaging element and the receiving element, at least one recess is formed between the engaging element and the receiving element to enable such pivoting. This allows a predefined angular positioning of the carriers relative to each other—in the assembled state of the engaging element and the receiving element. During the angular positioning process, the carriers to be coupled are thus already joined together, so that unwanted decoupling of carriers that have already been coupled can be avoided during angular positioning. The pivoting can be done in the circumference of the realized slot, wherein the respective ends of a slot can form a mechanical stop for the pivoting movement of the carriers relative to each other. The size of the slot can determine the angular range of the swivel movement.

In a structurally particularly simple manner, the engaging element may have a circular disc-shaped portion, and wherein preferably the receiving element may have a recess substantially complementary to the circular disc-shaped portion of the engaging element. Such a circular disk-shaped section, in particular in conjunction with a corresponding complementary recess of a receiving element, can enable the above-described pivoting movement of the carriers relative to one another in a particularly simple manner. The circular disk-shaped section can slide its outer edge along an inner edge of the complementarily formed recess during the pivoting movement. In two-dimensional form, the underlying principle is roughly similar to that of a ball joint with a movable ball arranged in a socket, wherein the engaging element corresponds to the ball and the receiving element to the socket.

In an advantageous embodiment, at least one code may be associated with the engaging element or the circular disk-shaped section or may be arranged on the engaging element or the circular disk-shaped section. This allows a continuous sequence of codes arranged next to each other and thus also a safe installation of several carriers relative to each other for the function of a code line formed by several carriers with structurally simple means.

Furthermore, with regard to a safe installation of several carriers relative to each other, the coupling device may comprise at least one—preferably removable—blocking element assignable to the receiving element or the engaging element for preventing the engaging element and the receiving element—in the assembled state of the engaging element and the receiving element—from pivoting relative to each other. This enables a straight-line arrangement of several carriers one behind the other by structurally simple means, wherein blocking element can be arranged, for example, in a slot formed between the engaging element and the receiving element in order to prevent two carriers from pivoting relative to one another. Such blocking elements can in principle be arranged or provided in the slots to allow straight and aligned arrangement of carriers relative to each other. If a curve then has to be laid, the blocking elements can be removed from a slot and a corresponding angular position between two carriers can be formed by pivoting the two carriers relative to each other.

In a structurally particularly simple manner, the carrier can be made of metal, for example aluminum, or have metallic components, for example aluminum. In particular, the use of aluminum enables a robust and, in terms of weight, lightweight and thus safe and easy-to-handle design of a carrier. Furthermore, with a view to safe installation, for example laying of carriers on a flat substrate, the carrier can be of flat design. This allows full-surface and thus secure and stable support of carriers on a flat substrate.

With the apparatus for presenting a code according to the invention, an exact alignment of codes to each other during laying is possible, wherein both straight code sections and—with a suitable design of the coupling device—also curves of codes can be reliably laid by means of the carriers. In this case, no code becomes unreadable at joints between carriers and the spacing of codes does not increase when curves are laid, as can occur with conventional rectangular carriers or code strips without a suitable coupling device.

With the apparatus according to the invention, simple and safe laying is possible both straight ahead and in freely selectable bending radii. In addition, easy interchangeability and a professional appearance are realized.

Finally, it should be expressly noted that the above-described embodiments serve only to discuss the claimed teaching, but do not limit it to the embodiment.

The invention claimed is:
1. An apparatus for presenting a code (1) having a carrier (2) and at least one code (1) assigned to the carrier (2), wherein the code is a code tape or code strip, wherein the carrier (2) has a coupling device (3) for coupling the carrier (2) to a further carrier (2), wherein the coupling device (3) comprises an engaging element (4) and a receiving element (5) for the engaging element (4), wherein the engaging element (4) of the carrier (2) can engage with the receiving element (5) of a further carrier (2) for coupling the two carriers (2) to each other, and wherein the engaging element

(4) and the receiving element (5) are pivotable relative to each other in the assembled state.

2. The apparatus according to claim 1, wherein the code is a code tape or code strip.

3. The apparatus according to claim 1, wherein the engaging element (4) is a male engaging element, and the receiving element (5) is a female receiving element.

4. The apparatus according to claim 1, wherein the engaging element (4) and the receiving element (5) are formed complementary to each other.

5. The apparatus according to claim 1, wherein the carrier (2) comprises both an engaging element (4) and a receiving element (5).

6. The apparatus according to claim 1, wherein the coupling device (3) is designed in such a way that gapless and/or form-fitting coupling of carriers (2) to one another is made possible.

7. The apparatus according to claim 6, wherein it is possible to join an engaging element (4) to a receiving element (5) in a puzzle-like manner.

8. The apparatus according to claim 1, wherein the engaging element (4) and the receiving element (5) are formed such that in the assembled state of the engaging element (4) and the receiving element (5) at least one slot (6) is formed between the engaging element (4) and the receiving element (5) for enabling such pivoting.

9. The apparatus according to claim 1, wherein the engaging element (4) has a circular disc-shaped portion (7).

10. The apparatus according to claim 9, wherein the receiving element (5) has a recess (8) substantially complementary to the circular disc-shaped portion (7) of the engaging element (4).

11. The apparatus according to claim 1, wherein at least one code (1) is associated with the engaging element (4) or the circular disc-shaped portion (7) or is arranged on the engaging element (4) or the circular disc-shaped portion (7).

12. The apparatus according to claim 1, wherein the coupling device (3) comprises at least one blocking element (9), which can be associated with the receiving element (4) or the engaging element (5), for preventing the engaging element (4) and the receiving element (5), in the assembled state of the engaging element (4) and the receiving element (5), from pivoting relative to one another.

13. The apparatus according to claim 12, wherein the blocking element (9) is removable.

14. The apparatus according to claim 1, wherein the carrier (2) is made of metal.

15. The apparatus according to claim 1, wherein the carrier (2) has metallic components.

16. The apparatus according to claim 1, wherein the carrier (2) is of flat design.

* * * * *

UNITED STATES PATENT AND TRADEMARK OFFICE
CERTIFICATE OF CORRECTION

PATENT NO. : 12,236,299 B2
APPLICATION NO. : 18/245502
DATED : February 25, 2025
INVENTOR(S) : Gerhard Siebert Page 1 of 1

It is certified that error appears in the above-identified patent and that said Letters Patent is hereby corrected as shown below:

In the Claims

In Column 10, Line 13, Claim 12, delete "receiving element (4)" and insert -- engaging element (4) --, therefor.

In Column 10, Line 14, Claim 12, delete "engaging element (5)," and insert -- receiving element (5), --, therefor.

Signed and Sealed this
Third Day of June, 2025

Coke Morgan Stewart
*Acting Director of the United States Patent and Trademark Office*